US010190307B1

(12) United States Patent
Wilson et al.

(10) Patent No.: US 10,190,307 B1
(45) Date of Patent: Jan. 29, 2019

(54) BASEMENT SEWER DRAIN RECOVERY AND DISCHARGE DEVICE

(71) Applicants: Joseph Wilson, Detroit, MI (US); Wanda Wilson, Detroit, MI (US)

(72) Inventors: Joseph Wilson, Detroit, MI (US); Wanda Wilson, Detroit, MI (US)

(*) Notice: Subject to any disclaimer, the term of this patent is extended or adjusted under 35 U.S.C. 154(b) by 0 days.

(21) Appl. No.: 15/677,658

(22) Filed: Aug. 15, 2017

Related U.S. Application Data

(63) Continuation-in-part of application No. 14/684,087, filed on Apr. 10, 2015, now Pat. No. 9,771,712, (Continued)

(51) Int. Cl.
*G05D 9/12* (2006.01)
*G05D 9/04* (2006.01)
(Continued)

(52) U.S. Cl.
CPC .............. *E03F 5/22* (2013.01); *E03C 1/12* (2013.01); *F04D 15/0218* (2013.01);
(Continued)

(58) Field of Classification Search
CPC ......... Y10T 137/779; Y10T 137/86348; Y10T 137/86187; Y10T 137/86131; Y10T 137/86139; Y10T 137/86147; Y10T 137/86155; Y10T 137/86083; Y10T 137/86035; Y10T 137/86043; Y10T 137/86067; Y10T 137/85986; Y10T 137/86027; Y10T 137/85978; Y10T 137/8593; Y10T 137/7323; Y10T 137/7326; Y10T 137/7316; Y10T 137/7319; Y10T 137/7313; Y10T 137/7306; Y10T 137/7303; Y10T 137/7293; Y10T 137/7287;
(Continued)

(56) References Cited

U.S. PATENT DOCUMENTS 2,250,271 A    7/1941 Morgan
2,311,197 A *  2/1943 Ahern .................. E03C 1/308
                                                134/24
(Continued)

*Primary Examiner* — Reinaldo Sanchez-Medina
*Assistant Examiner* — Hailey K Do
(74) *Attorney, Agent, or Firm* — Ronald R. Kilponen

(57) ABSTRACT

Disclosed is a basement sewer drain pump housing that draws fluid from a drain into a housing, where after the fluid is discharged from the housing and out of the basement. The device comprises a pickup tube having a fluid level sensor, which is placed within a sewer main drain or floor drain. The housing comprises an enclosed volume, a suction tube connected to the pickup tube, a suction pump, and a discharge pump. The pump is activated by a switch controlled by the pickup tube fluid sensor, the fluid is drawn into the housing from the drain and discharged through a discharge pipe. The device operates from outlet or battery and serves as a basement drain pump that prevents fluid and sewage backflow during power outages and plumbing blockages. Another modification provides two donuts to prevent the flow of fluid locking both the floor drain and the main sewer drain. Another embodiment show an inflator to stop the flow of fluids.

3 Claims, 9 Drawing Sheets

Related U.S. Application Data which is a continuation-in-part of application No. 13/721,155, filed on Dec. 20, 2012, now abandoned.

(60) Provisional application No. 61/610,264, filed on Mar. 13, 2012.

(51) Int. Cl.
| | |
|---|---|
| *F16K 33/00* | (2006.01) |
| *E03F 5/22* | (2006.01) |
| *F04D 15/02* | (2006.01) |
| *E03C 1/12* | (2006.01) |
| *F16L 55/00* | (2006.01) |
| *F16K 7/10* | (2006.01) |

(52) U.S. Cl.
CPC ............... *F16K 33/00* (2013.01); *G05D 9/04* (2013.01); *G05D 9/12* (2013.01); *F16K 7/10* (2013.01); *F16L 55/00* (2013.01); *Y10T 137/3584* (2015.04); *Y10T 137/7287* (2015.04); *Y10T 137/7293* (2015.04); *Y10T 137/7306* (2015.04); *Y10T 137/7323* (2015.04)

(58) Field of Classification Search
CPC ......... Y10T 137/3584; Y10T 137/3786; Y10T 137/301; Y10T 137/3021; Y10T 137/3003; G05D 9/00; G05D 9/02; G05D 9/04; G05D 9/12; F16L 55/124; F16K 7/10; F16K 33/00; E03F 7/04; E03F 5/0407; E03F 5/0408; E03F 5/0409; E03F 5/0416; E03F 5/0417; E03F 5/042; E03F 5/08

See application file for complete search history.

(56) References Cited

U.S. PATENT DOCUMENTS

| | | | |
|---|---|---|---|
| 2,795,193 A | 6/1957 | Linscott | |
| 3,491,922 A | 9/1970 | Mylting | |
| 3,564,103 A * | 2/1971 | Brachschob | C01B 32/942 138/93 |
| 3,842,864 A * | 10/1974 | Riegel | F16K 7/10 138/93 |
| 4,203,473 A * | 5/1980 | Roberson, Sr. | F16K 7/10 138/93 |
| 4,417,598 A * | 11/1983 | DePirro | E03F 7/04 137/2 |
| 4,515,517 A | 5/1985 | Sloan | |
| 4,624,280 A * | 11/1986 | DePirro | E03F 7/04 137/392 |
| 4,796,658 A | 1/1989 | Caple | |
| 4,852,609 A | 8/1989 | Schoenaver | |
| 5,079,950 A * | 1/1992 | McKiernan | G01F 23/00 200/84 C |
| 5,349,722 A | 9/1994 | Chayer | |
| 5,699,049 A * | 12/1997 | Difiore | E03F 7/00 137/558 |
| 5,967,759 A | 10/1999 | Jurado | |
| 6,049,940 A | 4/2000 | Robitaille | |
| 6,149,390 A | 11/2000 | Fisher et al. | |
| 6,516,832 B1 * | 2/2003 | Myers | E03B 7/003 138/93 |
| 6,854,479 B2 | 2/2005 | Harwood | |
| 7,000,641 B2 * | 2/2006 | Welfare | F16K 7/10 137/488 |
| 7,178,512 B1 | 2/2007 | Merten | |
| 7,907,059 B1 * | 3/2011 | Guy | G01F 23/242 137/392 |
| 8,032,256 B1 | 10/2011 | Wolf et al. | |
| 8,066,029 B2 * | 11/2011 | McDonald | E03B 7/071 137/363 |
| 8,800,601 B2 * | 8/2014 | Mainzer | F16L 55/46 137/15.08 |
| 9,725,894 B2 * | 8/2017 | Caux | E03F 7/04 |
| 2006/0093492 A1 | 5/2006 | Janesky | |
| 2009/0123296 A1 | 5/2009 | Bialick et al. | |
| 2009/0288717 A1 | 11/2009 | Lenox | |
| 2010/0319296 A1 | 12/2010 | Trotter | |
| 2011/0005615 A1 | 1/2011 | Savaria | |

* cited by examiner

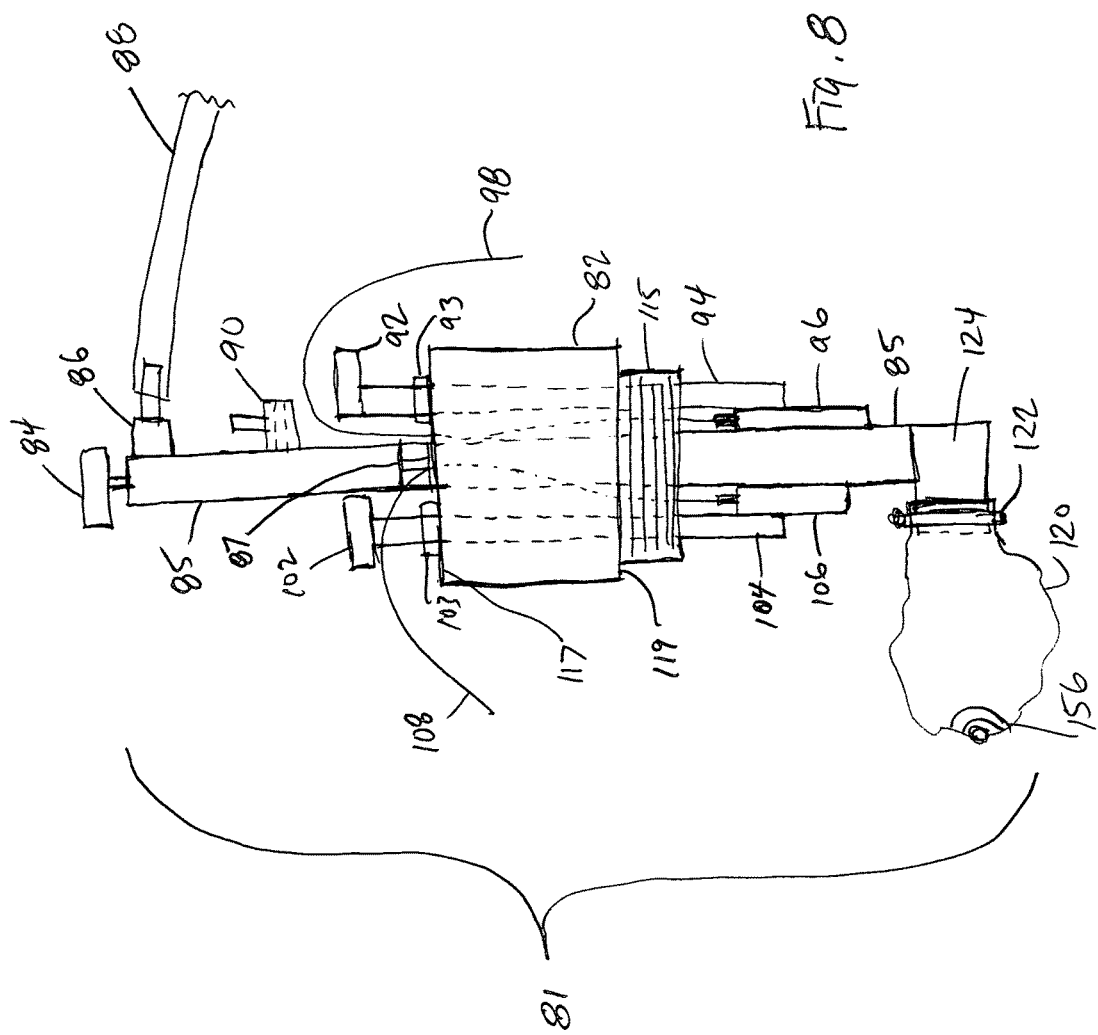

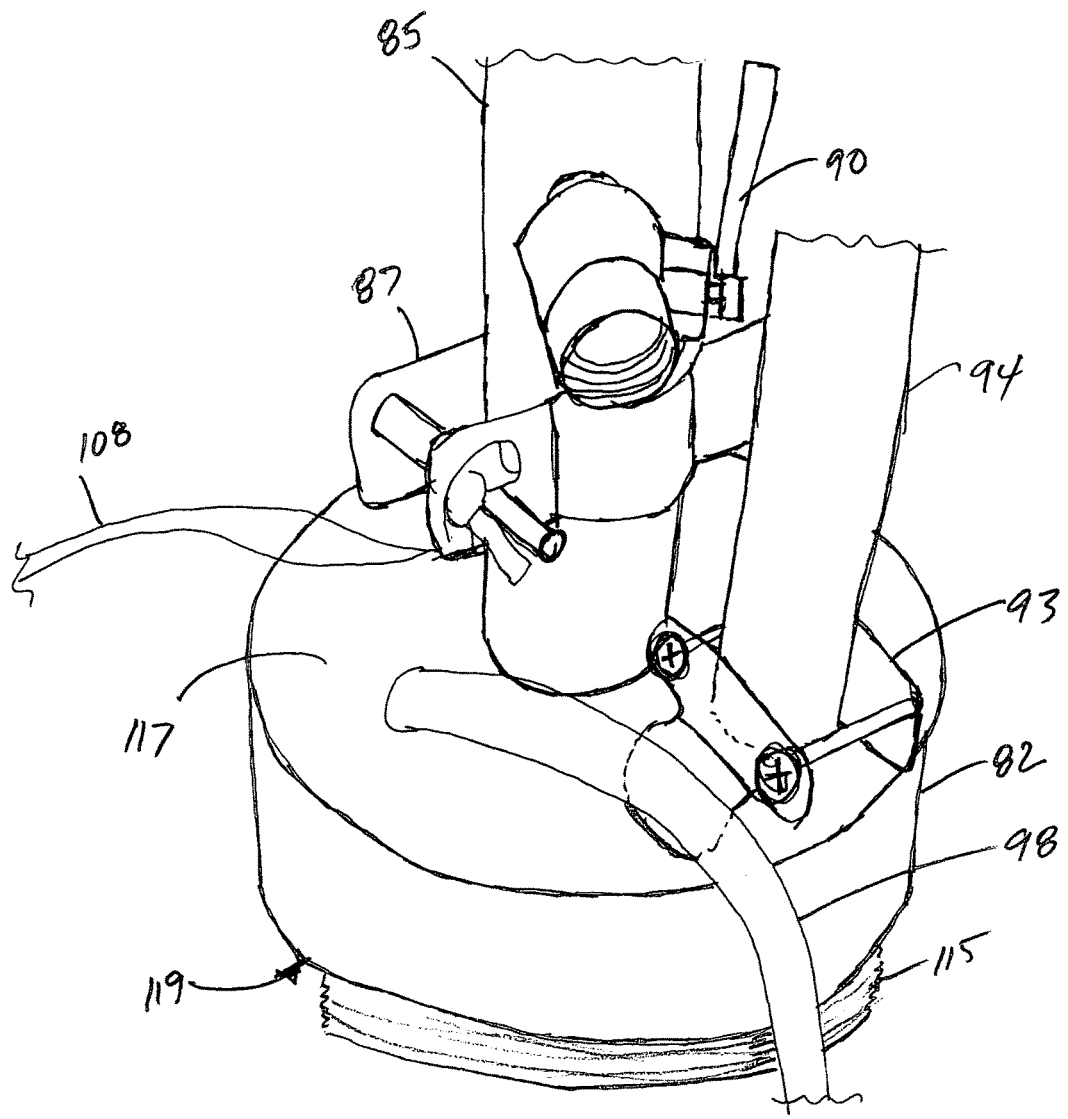

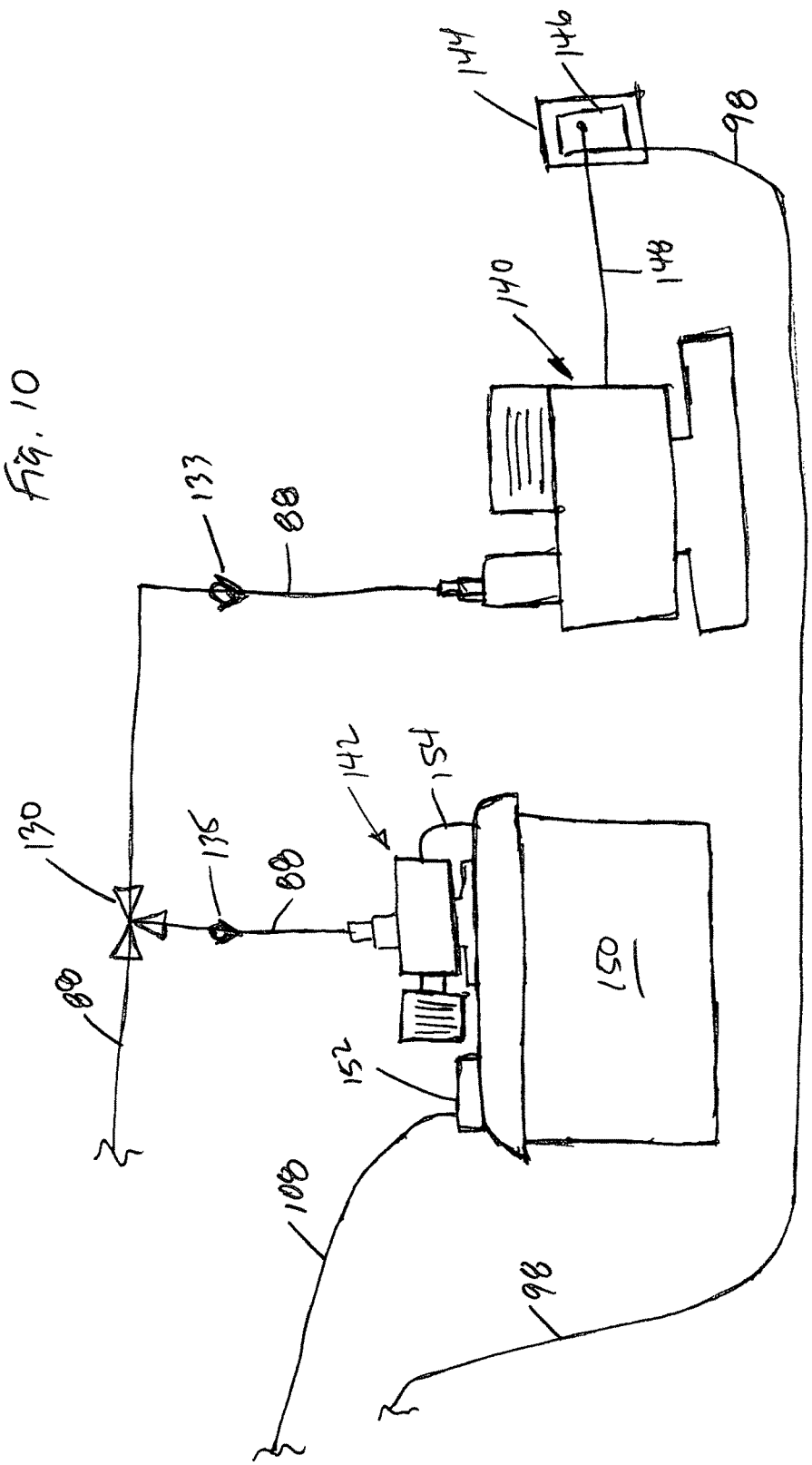

BASEMENT SEWER DRAIN RECOVERY AND DISCHARGE DEVICE

CROSS REFERENCE TO RELATED APPLICATION

This application claims the benefit of U.S. Provisional Application No. 61/610,264 filed on Mar. 13, 2012, entitled "Raw Sewage Recovery System" and is a continuation in part of U.S. Utility patent application Ser. No. 13/721,155 filed Dec. 20, 2012 entitled Basement Sewer Drain Recovery and Discharge Device now abandoned and is a continuation in part of U.S. Utility application Ser. No. 14/684,087 filed Apr. 10, 2015 entitled Basement Sewer Drain Recovery and Discharge system currently pending. The above identified Provisional Application for Patent and Utility Applications are herein incorporated by reference in their entirety to provide continuity of disclosure.

BACKGROUND

Field

The present embodiments relate to residential sewage and drainage systems. More specifically, the present embodiments pertain to a sewage drain pump and basement maintenance device that requires no installation or simple installation and can prevent the overflow of a basement floor drain during periods of high water or as a result of a blockage in the system.

Basement floor drains are common in older residences for the purposes of draining accumulated water from the basement. The floor drain is placed at the lowest part of the house within the basement to collect water and allow it to flow into the drainage system of the rest of the house. Problems arise with this system of water removal when there is excess rainfall or when the house drainage system is clogged, either within its own limits or along its connection to an external system. When rainfall raises the water table and the household drainage system is unable to remove the water, this drain can overflow and cause fluids to backfill into the basement rather than drain therefrom. Similarly, when there is a clog within a combined sewage and drainage system, the clog can cause fluid, sewage and waste to flow up through the drain, contaminating a basement and causing flood damage thereto.

Several remedies to this common problem have been implemented in the art, and include standpipe structures, pumps, and sumps that either delay the backflow of fluid or remove it once the fluid has entered the basement. Sump pump devices are common in more modern homes, wherein incoming water drains to the sump location and the sump pump discharges the accumulated water from the basement before it causes damage. Traditional sump pumps are generally installed when the foundation of the home is built above the water table. Homeowners can install sump pumps if they live in a part of the country where storms often flood the basement; however sump pumps require the homeowner to make significant modifications to the basement structure and are not easily installed. These devices also do not prevent the backflow of sewage from a drain pipe, but rather collect and discharge fluid after the event.

The present embodiments relate to a self-contained, basement floor drain pump unit that includes a suction pump and a discharge pump for drawing fluid from within a basement main sewer drain or directly from the basement floor drain. The device pumps fluid into its housing and then discharges the waste from the basement before it enters the living space. An elongated pick-up tube is placed within the main sewer drain line or within the basement floor drain, where a fluid sensor monitors the fluid level to energize the suction pump after a threshold level is crossed. The suction pump pumps the fluid and sewage into an enclosed housing, where after a discharge pump energizes after the casing has filled above a given level within the casing. The discharge pump connects to an exhaust pipe that routes the fluid from the basement. Another embodiment running on battery power can be activated when the power is out to prevent the flow of fluids in the sewer line and standpipe.

Another embodiment is shown and disclosed that is inserted into a vertical clean out pipe. This device can detect water or sewage levels in the clean out pipe and when detected can power an air compressor. The air compressor can then pump compressed air to an inflator that will inflate to a predetermined pressure. The inflator blocks off the pipe which prevents the backing up fluids from discharging in to the basement. The device can have two compressors, one that is powered by standard wall 110 voltage and a second compressor that can be powered by a 12 volt battery system. This device prevents the back up fluids from discharging into the basement when the power is out.

Description of the Background Art

Devices have been disclosed in the background art that relate to sewage pump systems and basement pumps. These include devices that have been patented and published in patent application publications, which generally relate to sump pump devices and other pump structures that are placed within a residential basement or have a connection with an existing floor drain. The present embodiments connect to a sewer main drain, floor drain or clean out pipe, but does not impede the ability of the main drain or floor drain from normal operation when deployed. Most devices in the background art block a floor drain port in favor of a closed system that eliminates the basic function of the drain and only considers backflow therefrom. The following is a list of devices deemed most relevant to the present disclosure, which are herein described for the purposes of highlighting and differentiating the unique aspects of the present embodiments, and further highlighting the drawbacks existing in the background art.

One such device is U.S. Pat. No. 4,852,609 to Schoenauer, which discloses a sump pump adapter having a tank that connects directly to a basement sewer pipe for pumping fluid that exits the pipe and into the tank using a sump pump device. A sump pump connects directly to the sewer drain pipe using a drain pipe coupler or is located adjacent thereto within the tank, where overflow from the drain triggers the sump pump to discharge fluid and sewage into an outlet pipe and out of the basement to prevent flooding and contamination. An embodiment of the device includes an elongated and upstanding standpipe within the tank such that fluid from the sewer pipe must travel the length of the standpipe and overflow into the tank before the adjacent sump pump triggers and discharges the contents into an outlet pipe. The Schoenauer device contemplates connection of a sump tank directly to a floor drain to pump overflowing contents therefrom. However, the connection of such a device over a floor drain may defeat the drain's purpose under normal operating conditions. The present embodiments contemplate an elongated member that is positioned within the drain to monitor for leaks, which not interfering with the drain's ability to collect and drain fluid from the basement under normal conditions.

Another device of particular relevance is U.S. Pat. No. 5,967,759 to Jurado, which discloses a basement flood control apparatus that comprises a pump unit separate from the floor and connecting to the basement floor drain and external water lines. The connection to the basement floor includes a sleeve that blocks the drain and forces backflowing contents into the pump unit. Within the pump unit casing is a first pump and auxiliary pump, whereby the first pump is energized when the water level in the unit reaches a threshold level, and the auxiliary pump energizes at a higher level. Water lines are used to clean out the system and to test the pumps between operations. The Jurado apparatus, while providing a means to draw fluid from a floor drain and pump it from a basement, utilizes a sealed floor drain configuration and diverging elements. The present embodiments require no fresh water connection and is simply placed within the floor drain or a basement main sewer line. The floor drain and sewer line continues to operate as normal; however during periods of high water or blockages, backflowing liquid triggers the pumping of fluid into a housing and from the housing out of the basement.

Other patents discuss sump pump devices and housings therefor. Specifically, U.S. Published Patent Application Publication No. 2006/0093492 to Janesky discloses a sump pump reservoir housing having an oblong cross section and a first and second sump pump therein for ejecting fluid drawn into the housing. U.S. Pat. No. 6,149,390 to Fisher discloses a sump pump having motor, a primary pump and a shell enclosing the motor and pump. An indicator provides notice of the motor operation and the construction of the device keeps much of the assembly out of the water to reduce faults or damage thereto over time.

The present embodiments comprise a self-contained unit that is deploy able in basements of older residences having flood drains that interconnect with household sewage drainage lines. The device offers a means to retrofit an existing basement without construction of a sump pump, while also diverting any backflowing wastewater from a drain pipe before it enters the basement. A pickup tube utilizes a sensor to energize a suction pump that draws the rising wastewater into a housing, where after it is pumped from the housing and from the residence using another pump device. It is submitted that the present embodiments substantially diverge in design elements from the background art, and consequently it is clear that there is a need in the art for an improvement to existing sewage drain pump devices. In this regard the instant embodiments substantially fulfill these needs.

SUMMARY

In view of the foregoing disadvantages inherent in the known types of basement pump devices now present in the background art, the present embodiments provide a new basement drain pump device that can be utilized for providing convenience for the user when preventing wastewater from backflowing into a basement through a main drain or floor drain.

It is therefore an objective of the present device to provide a new and improved drain pump device that has all of the advantages of the background art and none of the disadvantages.

It is another objective of the present device to provide a drain pump device that is comprised of an enclosed unit that requires no installation or modification of an existing basement to deploy. Another objective of the present device is to provide a drain pump device that is connectable to an existing basement floor drain or main drain for monitoring backflowing fluid, wherein the device does not interfere with the ability of the drain to allow fluid within the basement to escape during normal conditions.

Yet another objective of the present device is to provide a drain pump having a suction pump and a discharge pump, the suction pump drawing sewage and fluid through a pickup tube placed within the drain, and the discharge pump sending collected fluid and sewage through a discharge tube and out of the residence.

Another objective of the present device is to provide a drain pump device having a discharge pump that monitors the fluid level within the pump housing to discharge fluid after a certain amount is collected.

Still yet another objective of the present device is to provide a drain pipe that can be inserted within the main sewer drain of a residence, where the pickup tube is inserted within the main drain clean-out and sealed using a wax ring to prevent leaks and sewer gas from exiting the clean-out while installed.

Another objective of the present device is to provide a drain pump device that operates from battery power or wall outlet power for use during normal conditions and during power outage periods.

Another objective of the present device is to alternatively provide additional elements for the battery operational mode where flow of fluids into the standpipe and sewer line is prevented.

Other objectives, features and advantages of the present embodiments will become apparent from the following detailed descriptions taken in conjunction with the accompanying drawings.

BRIEF DESCRIPTIONS OF THE DRAWINGS

Although the characteristic features of these embodiments will be particularly pointed out in the claims, the device itself and manner in which it may be made and used may be better understood after a review of the following description, taken in connection with the accompanying drawings wherein like numeral annotations are provided throughout.

FIG. 8 shows a side view of another embodiment of a device for stopping the flow of backing up fluids in a drain pipe.

FIG. 9 shows a partial perspective view of one embodiment of a cap and one configuration of related elements.

FIG. 10 shows a side view of one embodiment of the first and second compressors and power supply arrangement.

DETAILED DESCRIPTION

Figure 1:
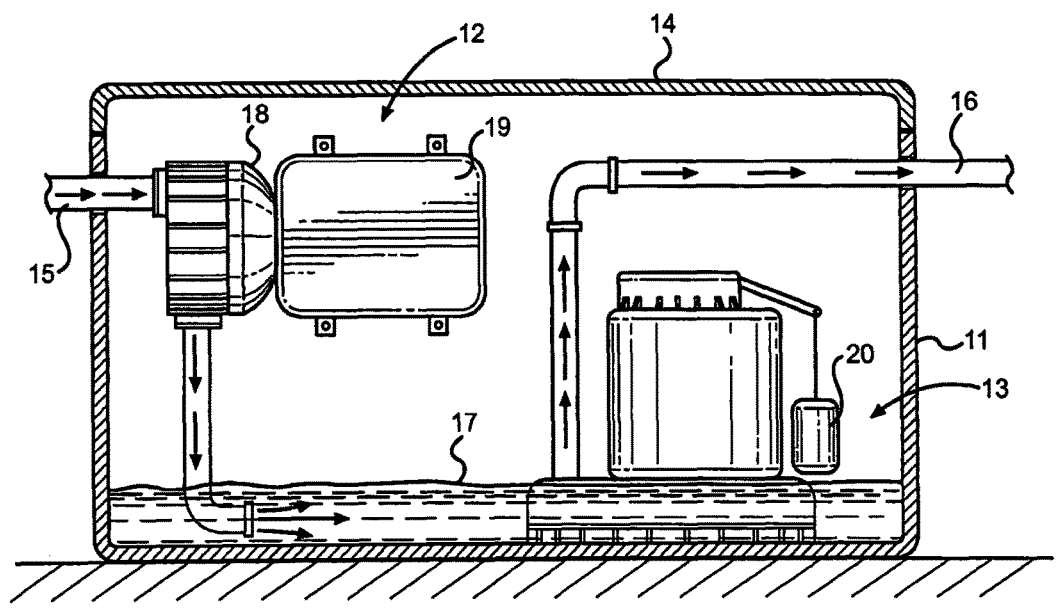
FIG. 1 shows a cross section view of one embodiment of the device.

Reference is made herein to the attached drawings. Like reference numerals are used throughout the drawings to depict like or similar elements of the drain pump device. For the purposes of presenting a brief and clear description of the device, the preferred embodiments will be discussed as used for preventing fluid and sewage from backflowing through a drain and into a basement. The figures are intended for representative purposes only and should not be considered to be limiting in any respect.

Referring now to FIG. 1, there is shown a cross section view of the basement drain pump of the present device. The device comprises a housing 11 having a lid 14, sidewalls, and an interior volume for supporting the operational features of the system for sewage recovery and discharge. Within the housing is a suction pump 12 that connects to a suction tube 15 for drawing in fluid and sewage from a drain. The pump 12 is adapted to draw fluid from the drain to the housing 11 for collection and recovery, preventing the contents of the drain from backflowing into the house and causing flood damage. This generally occurs during periods of high water, when there is a blockage in the system or during power outages. Waste water and sewage can backflow from the household drainage system and leak into a homeowner's basement if not carefully monitored.

The pump 12 creates suction on the tube 15 once a threshold water level within the drain is detected to suck wastewater from the drain and deposit it within the housing interior. In a first embodiment, the pump 12 is a water pump comprising an electric motor 19 connected to a centrifugal pump 18 or rotary pump having an inlet and outlet. The motor 19 spins an impeller within the pump 18, creating a suction that draws liquid through the inlet and causes it to be pumped out of the outlet. The pump outlet connects to a wastewater tube that terminates within the housing 11 to allow the wastewater to collect therein. Using a water pump requires keeping the pump 12 primed. Therefore a one-way valve 33 along the suction tube 15 keeps water within the pump between uses to prevent dry running or damage to the pump. Adjacent to the suction pump 12 and within the housing 11 is a discharge pump 13 that is adapted to monitor the level of wastewater 17 within the housing 11 and pump the fluid therefrom. The pump 13 is preferably a sump pump device or sewer pump that monitors the fluid level and pumps the fluid contents from the housing after a threshold level is passed. The fluid 17 is pumped into a discharge pipe 16 that is routed from the basement, thereby removing the sewage and wastewater from the basement before damage can occur.

The discharge pump 13 comprises an electrically driven fluid pump having an intake that is along the base of the housing 11. An electric motor drives a motor shaft connected to an impeller, which draws fluid through the intake and into the discharge pipe 16 connected to the discharge port of the pump 13. Operation of the pump motor is controlled by a fluid sensor of fluid level float 20, which energizes the pump 13 once a threshold fluid 17 level is reached. This type of pump is well defined in the art of sump pump and sewage pump devices, where its operation is controlled by a fluid level sensor and an electric motor drives an impeller for discharging fluid from a location. It is not desired to limit the present discharge pump to a set of elements, but rather to disclose a working embodiment that provides a fluid level-activated pump mechanism for discharging fluid 17 from the interior of the housing 11 and out of the basement.

Figure 2:
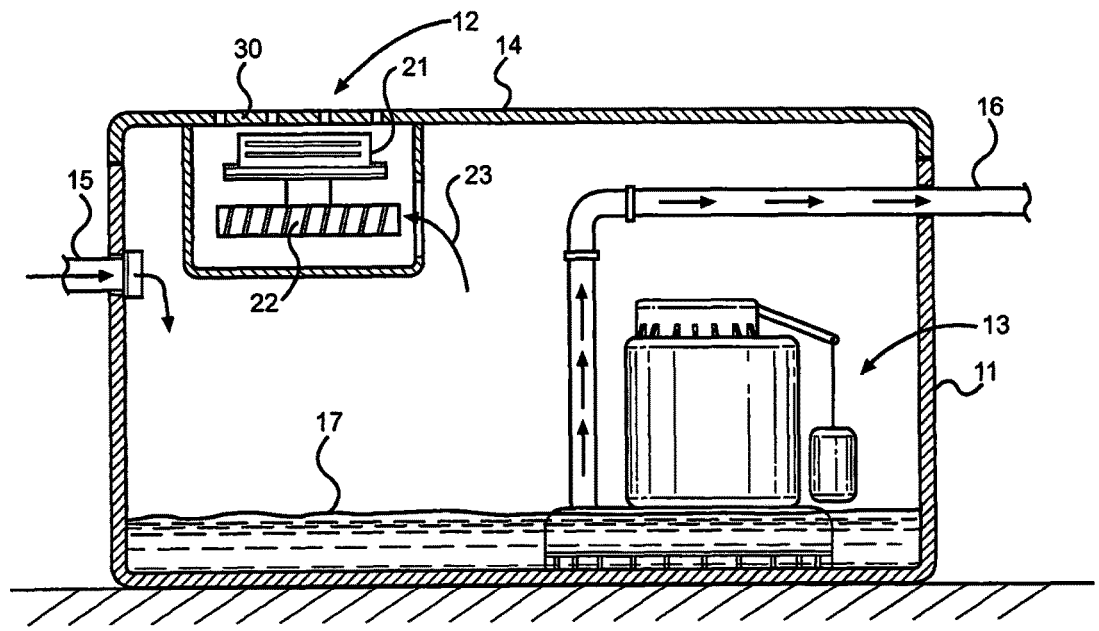
FIG. 2 shows a cross section view of another embodiment of the device.

Referring now to FIG. 2, there is shown another cross section view of another embodiment of the pump system, wherein the intake pump or suction pump 12 utilizes an air vacuum within the housing 11 rather than a pump having a liquid impeller. In this embodiment, the contents of the wastewater do not directly contact a spinning impeller, causing less contamination and risk of damage to the pump itself. In this embodiment, an electric motor 21 spins a fan or air impeller 22 and the assembly is placed within an enclosure attached to the lid 14 of the housing. Along the lid 14 and above the electric motor and fan is an air exhaust port 30. The port 20 is a slotted or has an aperture region that allows air to be discharged from the interior of the housing 11. The fan 22, as it spins at a high rate, draws 23 in air from the housing interior into the fan enclosure, over its fan blades and out of the exhaust port 30. The high flow rate of the fan creates a vacuum within the housing that draws wastewater through the suction tube 15 and into the housing interior in a similar fashion as a wet vacuum found in most garages. This assembly allows the motor and fan to remain separated from the wastewater, but requires the housing 11 to affect a tight seal against the lid 14 such that air is only drawn through the suction tube 15 and not the surrounding environment. The discharge pump 13 remains the same between embodiments, where an electrically driven impeller pumps the fluid 17 within the housing through a discharge pipe 16 out of the user's basement.

Figure 3:
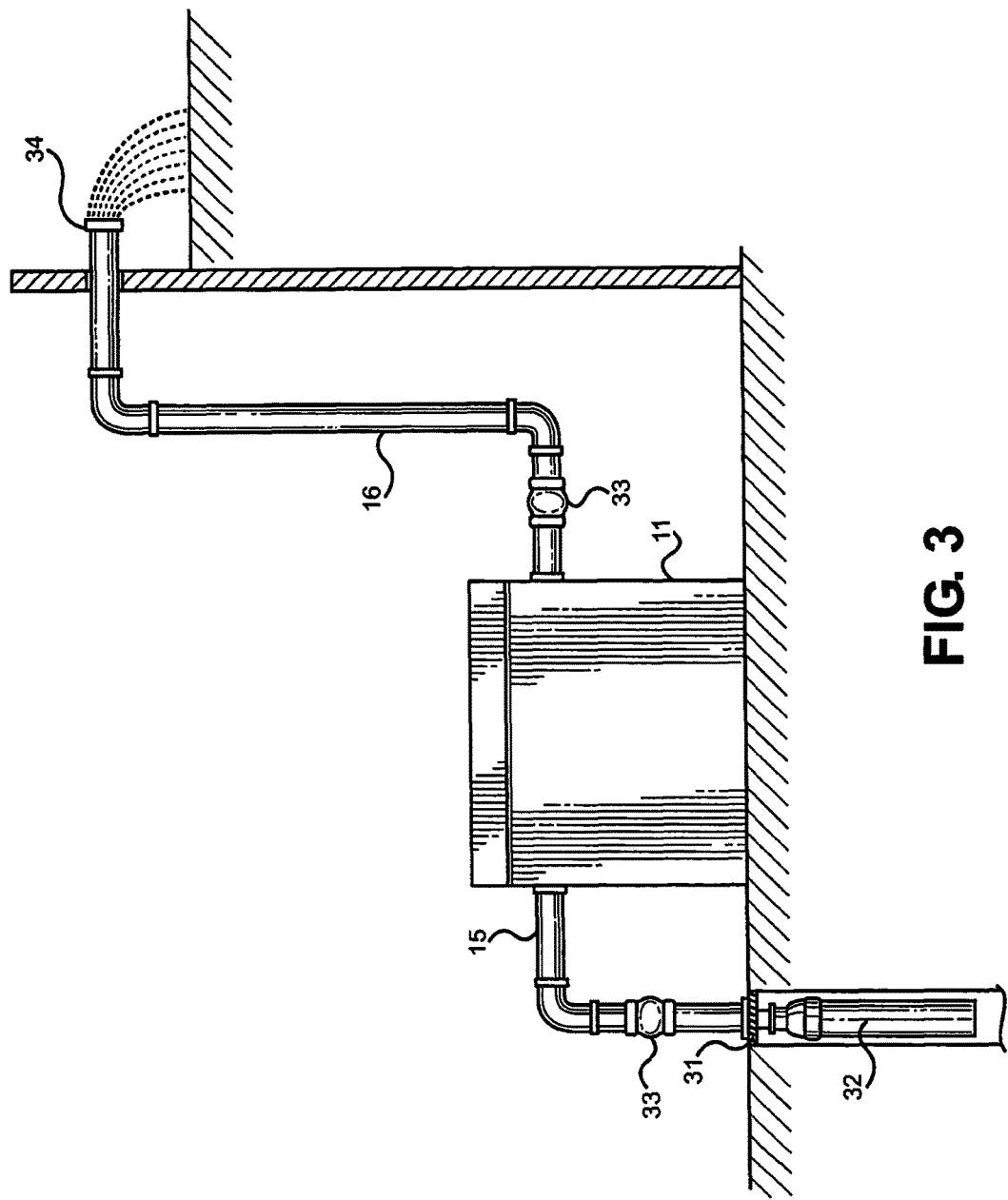
FIG. 3 shows a view of one embodiment in operation, drawing fluid from a basement flood drain and discharging it outside of the basement.

Referring now to FIG. 3, there is shown a view of the pump system in a working state, connected to a floor drain 31 and pumping fluid out of the basement and discharging the fluid to the exterior of the building. To draw fluid from the drain, an elongated pickup tube 32 is provided, which is an extension of the intake suction tube 15 that is placed within the drain 31. The pickup tube 32 includes an internal water sensor device such that when the fluid level within the pickup tube 32 reaches a certain level, the sensor activates a switch that controls the operation of the suction pump within the housing, energizing the pump and drawing the drain fluid into the pickup tube 32, through the suction hose 15 and into the housing 11. The wastewater fluid accumulates within the housing to a given level, where after the discharge pump energizes and sends the fluid from the housing 11 through the discharge tube 16 and out of the basement. The end of the discharge tube 16 terminates 34 along the exterior of the house and out of the basement, while a one-way valve 33 prevents fluid from backfilling into the housing once the pump ceases to operate. Similarly on the suction hose 15 above the pickup tube 32 is another one-way valve 33 that keeps water within the suction hose 15 to prime the suction pump between uses. If the suction pump 12 within the housing 11 is a vacuum pump, this one-way priming valve is not required.

The connection between the suction tube 15, the discharge tube 16 and the housing must be fluid tight, while the tubes 15, 16 themselves may be flexible or solid piping as desired by the user. Likewise the connection between the suction tube 15 and the drain 31 may be a secured connection, or alternatively the tube may simple be loosely positioned therein. Placement of the tube 15 into the drain is not desired to restrict fluid from entering the drain from the basement, as in normal operation, but rather the pickup tube is designed to monitor the fluid level within the drain and energize the suction pump in the event of backflowing wastewater or other fluid. The pumps themselves are ideally those suited for pumping sewage and thickened fluid, where more viscous fluids will not clog to seize the pumps during operation.

Figure 4:
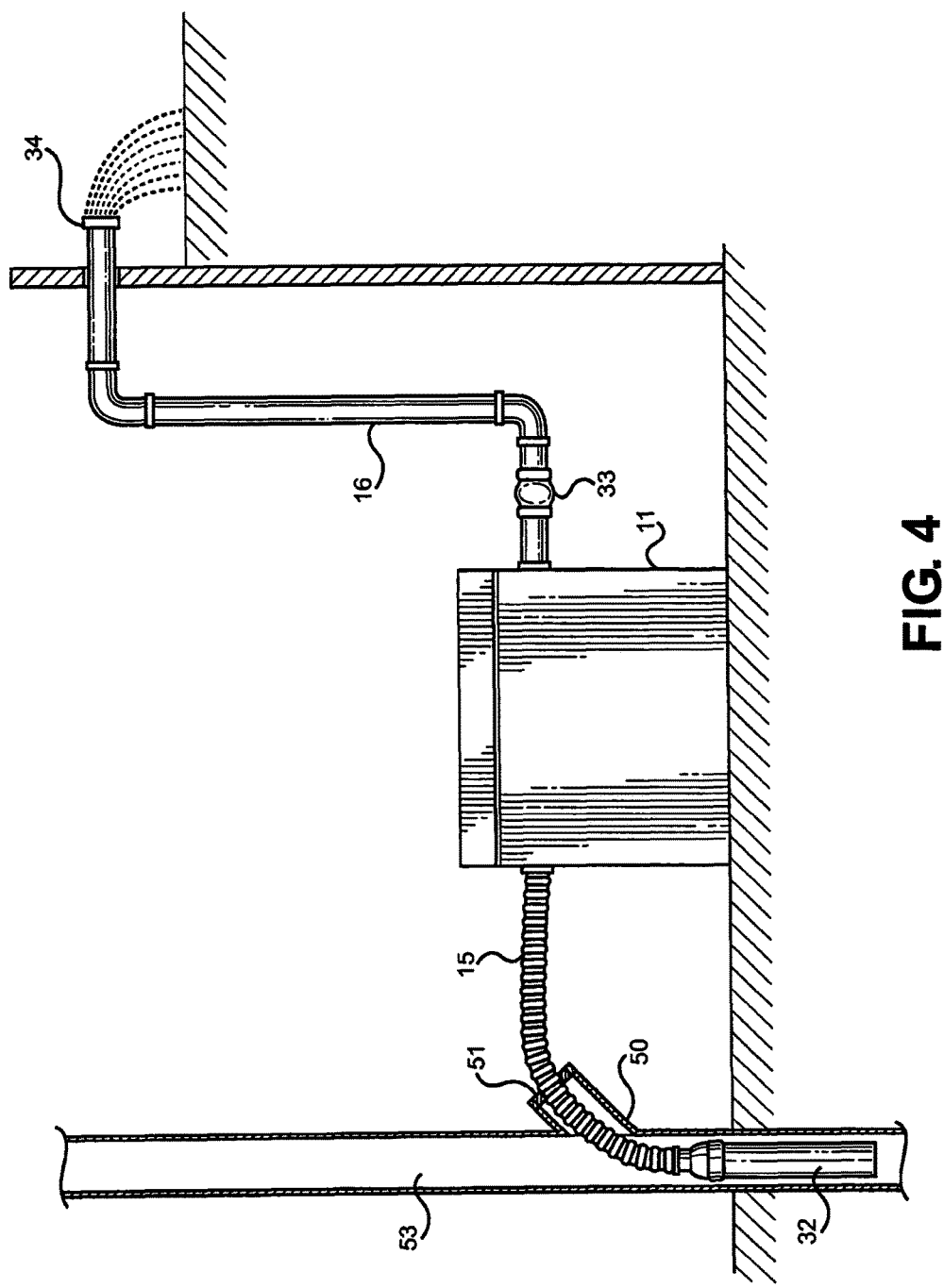
FIG. 4 shows a view of one embodiment drawing fluid from a main sewer drain of a residence and discharging it outside of the basement.

Referring now to FIG. 4, there is shown a view of the device in a working state and in its preferred configuration: connected to the main sewer drain 53 of a residence. The main drain 53 collects all outgoing sewer waste from the residence and is downstream from the floor drain, therefore intercepting sewage from the main drain 53 is more effective than the upstream floor drain. In this deployment, a flexible suction tube 15 is used to place the pickup tube 32 within the main drain 53 through a clean-out 50. The clean-out 50 provides access to the main drain 53 and is normally plugged. The pickup tube 32 and suction tube 15 of the device is adapted to remove the clean-out plug and replace it with a wax ring seal 51, which seals any gaps between the suction tube 15 and the clean-out 50. The wax ring seal 51 prevents fluid and sewer gas from the existing clean-out 50 and entering the user's home. During operation, the pickup tube 32 monitors for backflowing sewage and triggers the suction pump within the housing 11, whereafter the sewage can be recovered therein and discharged 16 outside of the home.

Figure 5:
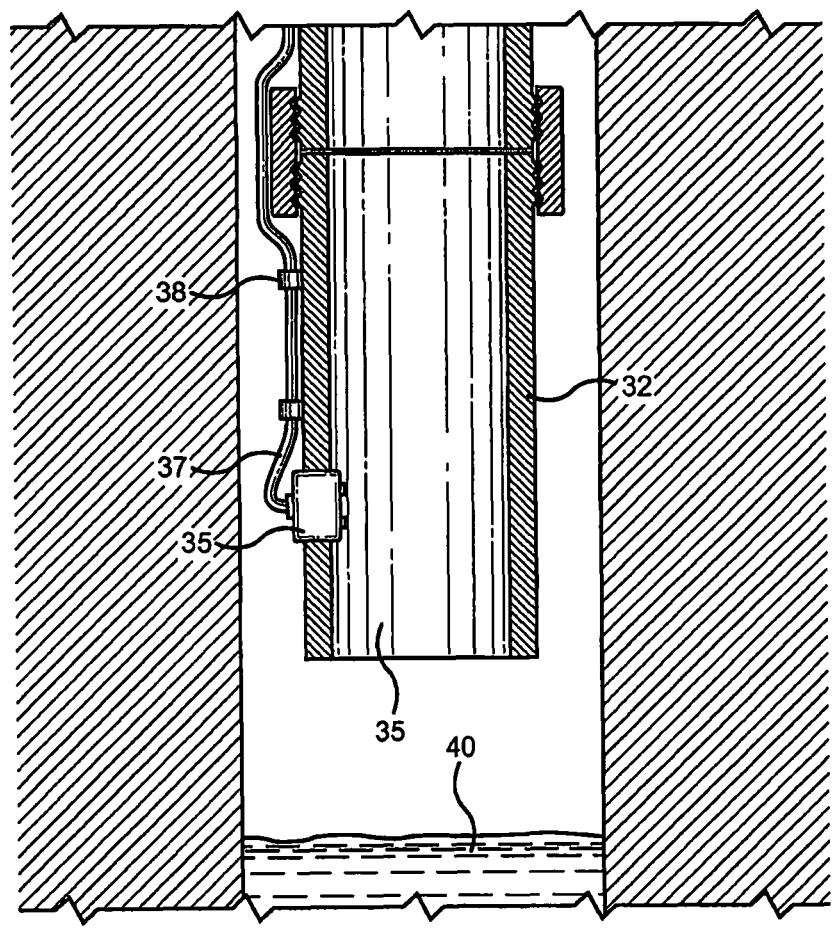
FIG. 5 shows a cross section view of one embodiment of the pickup tube within a drain.

Referring now to FIG. 5, there is shown a cross section view of the pickup tube 32 within the drain. In this view, the interior of the tube 32 and the water sensor 36 are visualized. The water sensor 36 is an electrical device that closes a switch that controls the suction pump within the pump housing. When the water level 40 reaches the level of the sensor 36, the suction pump energizes to draw the water through the tube 32 and into the housing to be discharged. This in turn monitors the fluid level 40 within the drain and prevents water from flowing out of the drain and into the interior of one's basement. The water sensor 36 may be any suitable electrical assembly that is capable of detecting the presence of water and sending signals to a switch to control the suction pump. It is not desired to limit the device to the structural layout or design show in FIG. 5, but rather it is desired to show a working embodiment where the sensor is secured through the tube sidewall and wired 37 to the pump within the housing. The wire connections 37 preferably run along the exterior of the pickup tube 32, where they are secured 38 along regular intervals and kept away from contact with the wastewater within the drain. The preferred placement of the sensor 35 is at least one foot inward from the end of the pickup tube opening so as to prevent short-cycling of the pumps and false triggers from inadvertent contact with water that is not truly a backflow warranting the suction pump activation.

Figure 6:
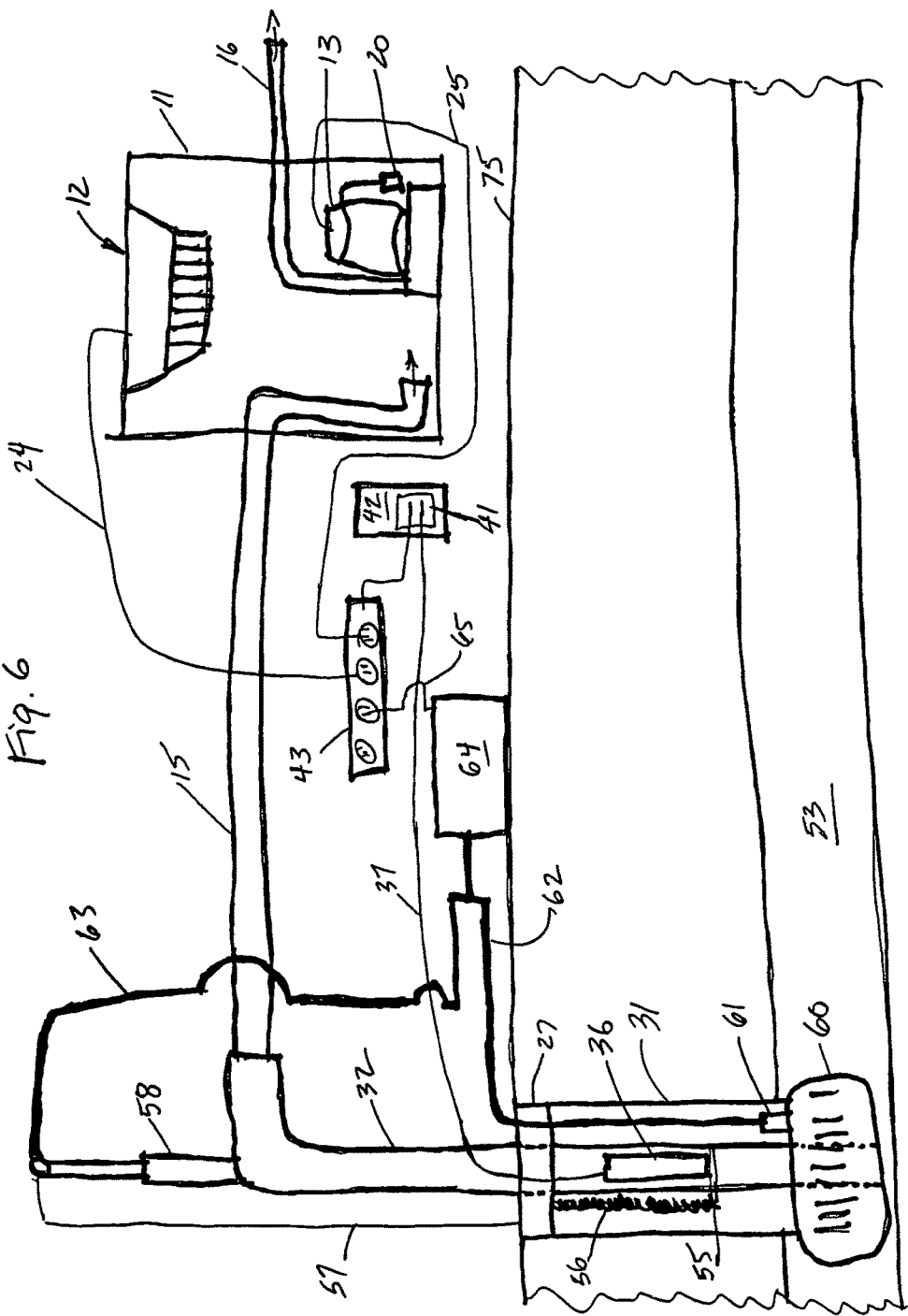
FIG. 6 shows another embodiment of a not to scale schematic of a discharge device.

FIG. 6 shows another embodiment of the discharge device for installation into the floor drain 31 in a basement. The pickup tube 32 has a cap 27 affixed. The cap 27 is able to be threaded into the fitting at the top end of the floor drain 31. Near the bottom of the pickup tube 32 is affixed an inflatable donut 60 that surrounds the bottom of pickup tube 32 and is affixed there. The donut 60 has a fill valve 61 for both inflating and deflating the donut 60. The fill valve 61 is attached by a first air line 62 to the compressor 64 which inflates and deflates the donut 60. The compressor 64 is also attached to the top of the cylinder 58 with second air line 63. The bottom of cylinder 58 is fixed to the top of the pickup tube 32. The top of the cylinder 58 is attached with a second air line 63 to the compressor 60 and hence provides the air that cylinder 58 requires to function. The top of the cylinder 58 is also affixed to a bracket 57. The opposite end of the bracket 57 is affixed to the cap 27. Thereby when the air cylinder 58 is provided with compressed air, the cylinder 58 drives the pickup tube 32 down into the floor drain 31 relative to the cap 27.

A spring 56 is located adjacent the pickup tube 32 and fixed to the underside of the cap 27 and to an attachment 55 nearer the bottom of the pickup tube 32. A sensor 36 is also affixed to the pickup tube 32 below the cap 27 and has a wire 37 which connects to a switch 41. The switch 41 plugs into the power supply 42. The power distributor 43 plugs into the switch 41 and when the switch 41 is closed, power flows from the power supply 42 to the power distributor 43. The power distributor 43 can be an extension cord type of device or any other device that will allow for the distribution of power to electrical devices. The power supply 42 can be a wall outlet or battery power for cases when the power is down in the house.

To engage this embodiment of the discharge system requires that water or sewage be backing up in the main sewer drain 53 such that it rises to a level that causes the sensor 36 to send a signal to the switch 41. Switch 41 closes which provides power to the power distributor 43 from either the power supply (wall outlet) or battery (not shown). The power distributor 43 thus provides power to the compressor via compressor power 65. This provides compressed air to the second air line 63 which drives the cylinder 58 and pickup tube 32 into the floor drain 31. As this occurs, spring 56 is extended resisting the movement of pickup tube 32 relative to the cap 27.

As the cylinder 58 is being driven, second air line 62 provides compressed air to the inflatable donut 60 which inflates in main drain 53 thereby retaining the pickup tube 32 within main drain 53. Concurrently, the pump 12 is provided power via vacuum power 24 from the power distributor 43 and begins to pull a vacuum from suction tube 15 which is connected to pickup tube 32. When the cylinder 58 and donut 60 reach a predetermined pressure, the compressor 64 shuts off. If the pressure for some reason falls below the predetermined pressure set, the compressor 64 will again engage providing compressed air to both the cylinder 58 and donut 60.

As the pump 12 runs it pulls a vacuum on the suction tube 15 and thereby the pickup tube 32 and this pulls any materials from the main drain 53 into the housing 11. As the level of material in the housing 11 rises, the float 20 begins to rise and this causes the discharge pump 13 to begin to run pumping the material out from within the housing 11 via the discharge pipe 16 thereby protecting the basement from becoming flooded.

It should be noted that the housing 11 and pump 12 could be a typical wet vacuum. The discharge pump 13 could also be located within the housing 11. This system could be portable or fixed.

Figure 7:
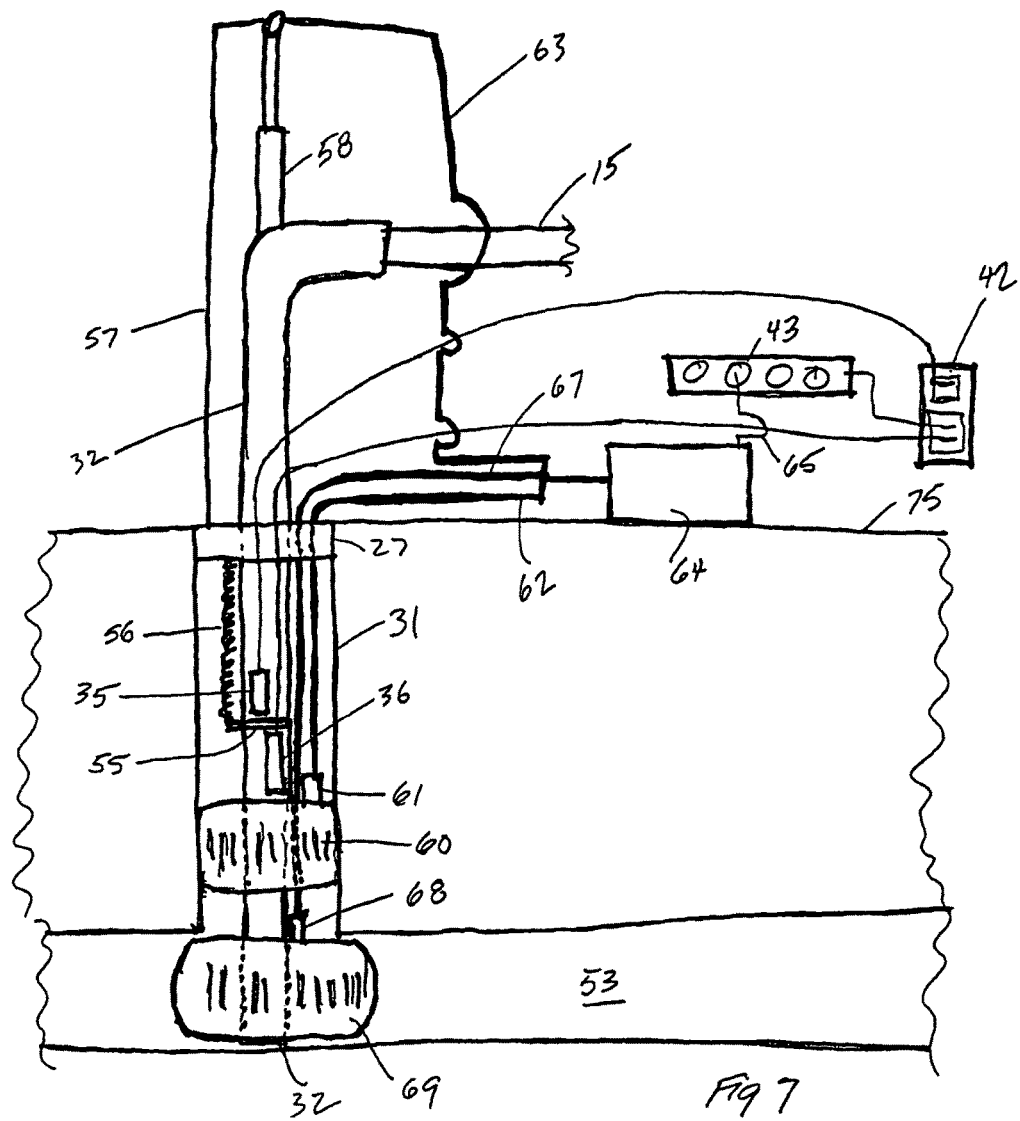
FIG. 7 shows another embodiment of the battery backup system of a flow prevention portion of the discharge device.

FIG. 7 shows another embodiment of the device that is meant to operate on battery power should the main power go out. This embodiment adds second donut 69 to near the bottom of the pickup tube 32. There is also an additional sensor 35 located in this embodiment about midway up the pickup tube 32. Operationally, if fluid began to backup in the main sewer drain 53 it would accumulate until sensor 36 was powered to turn the system on shown in FIG. 6 and explained previously. The embodiment shown in FIG. 7 is engaged if the power is out. If the power is out then sensor 36 would not be engaged and hence the unit shown in FIG. 6 would not be engaged and the fluid would continue to rise in the floor drain 31. When the fluid reaches sensor 35 it would activate the power supply 42 which in this embodiment can be a 12 volt battery or any other type of power that is not 110 volt power. When the sensor 35 turns on the switch to the power distributor it turns on the compressor 64 via compressor power 65 cord. The compressor 64 thereby provides compressed air to the air cylinder 58 which drives the pickup tube 32 into the main sewer drain 53. Simultaneously inflatable donut 60 and second donut 69 are inflated to a predetermined pressure. Inflatable donut 60 seals the flow of liquids into the floor drain 31 and second donut 69 seals the flow of liquids in the main sewer drain 53. This thereby prevents fluid backflow into the basement of the residence in the instance where the main household power is not on.

FIG. 8 shows one embodiment of a preventer 81. Preventer 81 has a cap 82 with a top 117 and a bottom 119. Attached to the bottom 119 are threads 115. Threads are configured to mate with a basement clean out pipe. An air post 85 is routed through the top 117 and bottom 119 to be configured a fixed but adjustable distance below the threads 115. Air post 85 has an air clamp 87 which rests near the top 117 and is adjustable such that it can be loosened and air post 85 can be moved vertically up and down relative to the cap 82. A first post 94 likewise runs from the top 117 to the bottom 119 of cap 82. Near the top of first post 94 can be located a first handle 92. First post 94 has a first clamp 93, also seen FIG. 9, which can be loosened to allow the first post 94 to move vertically relative to the cap 82. Near the bottom of first post 94 is located first sensor 96. First sensor 96 is located adjacent to air post 85. First sensor 96 senses the presence or depth of fluid (not shown) and then signals the first compressor 140 to operate. As first compressor 140 operates, compressed air is pumped from first compressor 140 through air hose 88 to the inlet 86 of the air post 85. The compressed air fills the air post 85, and eventually, the inflator 120 which cuts off the flow of fluids in the pipe.

FIG. 8 also shows a valve 156 on the inflator 120. Valve 156 can release any residual air when the system is not being powered with compressed air. This is to ensure that the inflator 120 does not impede the flow of fluids when it is not needed. Valve 156 will not release air when the inflator 120 receives compressed air and will release compressed air when not charged.

If for some reason the 110v household power is out, the first compressor 140 would fail to operate and the fluid level would continue to rise.

Opposite first post 94 is second post 104. Second post 104 also has a second handle 102 near the top and a second clamp 103. The second clamp 103 can be loosened and the second handle 102 could be moved in a vertical up or down position relative to cap 82. Second post 104 has a second sensor 106 located near the bottom of second post 104 and adjacent to the air post 85, FIG. 8.

If the fluids were to rise above the level of first sensor 96 and first compressor 140 was not able to perform for instance if the 110v power was out, the fluid level would continue to rise. The first compressor 140 is attached to a first controller 146 with a first power cord 148. The first controller 146 engages with an outlet 144 having 110V household power. If the fluid level rose to the level of the second sensor 106 this would send a signal through the second sensor signal 108 to the second controller 152 which would engage the second compressor 142, FIG. 10. The compressed air would travel through the air hose 88 to the inlet 86 of air post 85. The compressed air would likewise fill the air post 85 and inflate the inflator 120 such that the fluid level would be stopped from rising or flowing.

An exhaust valve 90 is shown affixed to the air post 85. This can be manually used to allow the compressed air to leave the inflator 120 and air post 85 once the fluid hazard has ceased to exist.

The air post 85 has an elbow 124 located near the bottom and the inflator 120 is affixed to this elbow 124 with a clamp 122.

It should be noted that first post 94 second post 104 and air post 85 can all be adjusted vertically relative to one another. It should also be noted that first handle 92 and second handle 102 are not required to operate the vertical adjustments, but do make the process easier.

An air gauge 84 is shown near the top of the air post 85. This allows the user to check the system pressure to ensure that it does not go too high and can also confirm that the pressure has left the system upon use of the exhaust valve 90.

It may be desirable to install a one way valve in the air hose 88 leading from each of the first and second compressors 140, 142 to prevent one compressor from back flowing compressed air to the other non-operating compressor, FIG. 10.

While FIG. 10 shows a separate 12 volt second compressor 142 and 110 volt first compressor 140, it should be understood that a combined 12 volt and 110 volt compressor is available and could be utilized. This dual powered unit could be substituted for the two compressors shown and described.

It is anticipated that a solar panel charging unit (not shown) could be used to power the battery 150 and keep it charged in the event of 110 volt power failure.

In operation, the present device is designed for those homes having combined sewage and drainage systems, which are common in older homes. The device is an independent structure that can be rapidly deployed in an emergency situation or provide constant vigilance for such basement structures. The device power source is ideally outlet power; however battery pack backup may be utilized in the event of power outages. This is particularly useful during storm events, where the area is likely to flood and simultaneously cut off power to many homes.

The present device describes a fluid suction pump and discharge pump system that is installed within a housing container. The discharge pump is ideally a sump or sewage pump style device while the suction pump may be a liquid or air suction pump. A built-in water sensor within the suction pick-up tube detects the water pressure or an elevation change such that the suction pump is energized to draw fluid into the container. Fluid is drawn into the container by a suction, which is then pumped by the discharge pump from the container and out of the basement. The present device removes sewage and sewage gas before the main drain or floor drain backs up and allows sewage into the homeowner's basement. The suction system draws the backup water into the container reservoir. Users finding themselves in a flood zone or living in older style homes having combined sewage and drainage systems will appreciate the ease of deployment and application of the present device to prevent flood and sewage damage in a basement environment.

It is therefore submitted that the instant device has been shown and described in what is considered to be the most practical and preferred embodiments. It is recognized, however, that departures may be made within the scope of this disclosure and that obvious modifications will occur to a person skilled in the art. With respect to the above description then, it is to be realized that the optimum dimensional relationships for the parts of the device, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosures.

Therefore, the foregoing is considered as illustrative only of the principles of the device. Further, since numerous modifications and changes will readily occur to those skilled in the art, it is not desired to limit the device to the exact construction and operation shown and described, and accordingly, all suitable modifications and equivalents may be resorted to, falling within the scope of the disclosures.

We claim:
1. A device for insertion into the sewer drain line of a home for preventing the flow of fluids from entering the home, the device comprising:
   a cylindrical cap having a cap top and a cap bottom, threads extending from the cap bottom;
   an air post, the air post extending through the cap from the top of the cap through the bottom of the cap, the air post having an air clamp, the air clamp allowing vertical adjustment and retention of the air post relative to the cap;
   a first post extending through the cap from the top of the cap through the bottom of the cap, the first post having a first post top and a first post bottom, a first handle, the first handle affixed to the first post top, a first sensor, the first sensor affixed to the first post bottom, the first post having a first clamp, the first clamp allowing vertical adjustment and retention of the first post relative to the cap;
   a second post extending through the cap from the top of the cap through the bottom of the cap, the second post having a second post top and a second post bottom, a second handle affixed to the second post top, a second sensor affixed to the second post bottom, the second post having a second clamp, the second clamp allowing vertical adjustment and retention of the second post relative to the cap;
   the air post having an air post top and an air post bottom, an air inlet located near the air post top, an air gauge located near the top, an elbow affixed near the air post bottom, an inflator attached to the elbow, a clamp affixing the inflator to the elbow;
   an air hose, one end of the air hose affixed to the air inlet, an opposite end of the air hose affixed to a first compressor;
   a first sensor signal attached to the first sensor for providing communication to a first controller, the first controller attached to an outlet, a first power cord for receiving power from the first controller and outlet, the first power cord transmitting said power to said first compressor, the first compressor providing compressed air to the air post via the air hose; and
   a second sensor signal attached to the second sensor for providing communication to a second controller on a battery, a second power cord for receiving power from the battery, the second power cord transmitting said power to a second compressor, the second compressor providing compressed air to the air post via the air hose.

2. A device for insertion into the sewer drain line of a home for preventing a flow of fluids from entering the home, the device comprising:
   a cylindrical cap, the cap having a cap top and a cap bottom, the bottom having threads extending therefrom;
   an air post, the air post having an air top and an air bottom, an air gauge located near the air top, an air inlet located near the top, an elbow attached to the air bottom, an inflator attached to the elbow, the air post inserted into the cap through the cap top and through the cap bottom, an air clamp located on the air post, the air clamp located between the air top and the cap, an air hose attached to the air inlet;
   a first post, the first post having a first post top and a first post bottom, a first handle located near the first post top, a first sensor located near the first post bottom, a first controller located on an outlet, a first sensor signal, the first sensor signal providing communication between the first sensor and the first controller, the first controller switching power on and off from the outlet;
   a second post, the second post having a second post top and a second post bottom, a second handle located near the second post top, a second sensor located near the second post bottom, a second controller located on a battery, a second sensor signal, the second sensor signal providing communication between the second sensor and the second controller, the second controller switching power on and off from the battery;
   a first clamp, the first clamp located on the first post between the first post top and the cap;
   a second clamp, the second clamp located on the second post between the second post top and the cap;
   a first compressor, the first compressor attached to a first power cord, the first power cord attached to the first controller, the air hose attached to the first compressor;
   a second compressor, the second compressor attached to a second power cord, the second power cord attached to the second controller, the air hose attached to the second compressor;
   a three way fitting, the three way fitting affixed to the air hose from the air post and the first compressor and the second compressor, a first check valve located in the air hose between the first compressor and three way valve, a second check valve located between the second compressor and the three way valve; and
   whereby a fluid level rises to contact the first sensor, the first sensor sends a signal to the first controller, the first controller powers on the first compressor, the first compressor sends air through the first check valve and three way valve to the air post thereby inflating the inflator and stopping the flow of fluids.

3. A device for insertion into a sewer drain line of a home for preventing a flow of fluids from entering the home, the device comprising:
   a cylindrical cap, the cap having a cap top and a cap bottom, the cap bottom having threads extending therefrom;
   an air post, the air post having an air top and an air bottom, an air gauge located near the air top, an air inlet located near the top, an elbow attached to the air bottom, an inflator attached to the elbow, the air post inserted into the cap through the cap top and through the cap bottom, an air clamp located on the air post, the air clamp located between the air top and the cap top, an air hose attached to the air inlet;
   a first post, the first post having a first post top and a first post bottom, a first handle located near the first post top, a first sensor located near the first post bottom, a first controller located on an outlet, a first sensor signal, the first sensor signal providing communication between the first sensor and the first controller, the first controller switching power on and off from the outlet;
   a second post, the second post having a second post top and a second post bottom, a second handle located near the second post top, a second sensor located near the second post bottom, a second controller located on a battery, a second sensor signal, the second sensor signal providing communication between the second sensor and the second controller, the second controller switching power on and off from the battery;
   a first clamp, the first clamp located on the first post between the first post top and the cap;

a second clamp, the second clamp located on the second post between the second post top and the cap;

a first compressor, the first compressor attached to a first power cord, the first power cord attached to the first controller, the air hose attached to the first compressor;

a second compressor, the second compressor attached to a second power cord, the second power cord attached to the second controller, the air hose attached to the second compressor;

a three way fitting, the three way fitting affixed to the air hose from the air post and the first compressor and the second compressor, a first check valve located in the air hose between the first compressor and three way valve, a second check valve located between the second compressor and the three way valve; and whereby a fluid level in the sewer drain line rises to contact the first sensor, the first sensor sends a signal to the first controller, the first controller fails to power on the first compressor, the fluid level continues to rise where the fluid in the sewer drain rises to contact the second sensor, the second sensor sends a signal to the second controller, the second sensor powers on the second compressor, the second compressor sends air through the second check valve and three way valve to the air post thereby inflating the inflator and stopping the flow of fluids.

\* \* \* \* \*